(12) United States Patent
Woo et al.

(10) Patent No.: US 9,013,495 B2
(45) Date of Patent: Apr. 21, 2015

(54) METHOD AND APPARATUS FOR RENDERING

(75) Inventors: Sang-oak Woo, Anyang-si (KR);
Seok-yoon Jung, Seoul (KR);
Kwon-taek Kwon, Seoul (KR);
Tack-don Han, Seoul (KR); Woo-chan Park, Seoul (KR); Woo-nam Chung, Seoul (KR); Jin-hong Park, Seoul (KR);
Jeong-soo Park, Gwachoon-si (KR)

(73) Assignees: Samsung Electronics Co., Ltd., Suwon-si (KR); Yonsei University Industry Foundation, Seoul (KR)

(*) Notice: Subject to any disclaimer, the term of this patent is extended or adjusted under 35 U.S.C. 154(b) by 1761 days.

(21) Appl. No.: 12/081,304

(22) Filed: Apr. 14, 2008

(65) Prior Publication Data

US 2009/0184959 A1 Jul. 23, 2009

(30) Foreign Application Priority Data

Jan. 18, 2008 (KR) ........................ 10-2008-0005855

(51) Int. Cl.
| | |
|---|---|
| G06T 9/00 | (2006.01) |
| G06F 17/00 | (2006.01) |
| G06F 15/00 | (2006.01) |
| G06F 13/12 | (2006.01) |
| G06T 15/40 | (2011.01) |

(52) U.S. Cl.
CPC .................................. *G06T 15/405* (2013.01)

(58) Field of Classification Search
USPC .............. 345/555; 707/693; 708/203; 710/68
See application file for complete search history.

(56) References Cited

U.S. PATENT DOCUMENTS

| | | | |
|---|---|---|---|
| 5,808,618 A | 9/1998 | Kawano et al. | |
| 6,476,811 B1* | 11/2002 | DeRoo et al. ................. | 345/427 |
| 6,636,226 B2 | 10/2003 | Morein et al. | |
| 6,961,057 B1* | 11/2005 | Van Dyke et al. ............ | 345/422 |
| 7,218,317 B2 | 5/2007 | Liao et al. | |
| 2003/0038803 A1* | 2/2003 | Morein et al. ................. | 345/421 |
| 2008/0294863 A1* | 11/2008 | Faerber et al. ................ | 711/170 |
| 2008/0304738 A1* | 12/2008 | Beilloin ....................... | 382/166 |

OTHER PUBLICATIONS

Hasselgren et al., "Efficient Depth Buffer Compression", Graphics Hardware, pp. 102-110, 2006.*
Kyungho Lee et al., "The Design of Depth Buffer Compression Memory for 3D Graphic Processor", Jan. 30, 2007, pp. 551-552.

* cited by examiner

*Primary Examiner* — Jeffrey Chow
(74) *Attorney, Agent, or Firm* — NSIP Law

(57) ABSTRACT

A rendering apparatus and method are provided. The rendering method includes: reading a block, corresponding to a fragment, from among compressed blocks stored in a depth buffer, by considering frequency information corresponding to the fragment and prepared in advance; and performing a depth test for the fragment by considering the restored block.

9 Claims, 3 Drawing Sheets

METHOD AND APPARATUS FOR RENDERING

CROSS-REFERENCE TO RELATED PATENT APPLICATIONS

This application claims the benefit of Korean Patent Application No. 10-2008-0005855, filed on Jan. 18, 2008, in the Korean Intellectual Property Office, the disclosure of which is incorporated herein in its entirety by reference.

BACKGROUND OF THE INVENTION

1. Field of the Invention

The present invention relates a method and apparatus for rendering, and more particularly, to a depth test which is a rasterization job for rendering a first model desired to be rendered so that a hidden surface which is a part of the first model hidden by a second model desired to be rendered cannot be displayed in a rendered result of the first model.

2. Description of the Related Art

When rendering (that is, visualizing) a model formed by a plurality of vertexes, a rendering apparatus performs a plurality of graphics operations for each of a plurality of fragments generated for respective planes formed by the vertexes. A depth test is an example of the graphics operations. More specifically, the depth test is a job for testing whether or not a fragment desired to be rendered can be expressed as a pixel on a screen, by comparing the depth value of the fragment with the depth value of a pixel corresponding to the fragment and stored in a depth buffer disposed in the rendering apparatus.

When a depth value of the fragment is read from the depth buffer for this depth test, it is preferable to use a smaller memory bandwidth for fetching a depth value read from the depth buffer. Accordingly, a method of performing a depth test by reading a depth value from a depth buffer and using the read depth value, while consuming a minimum memory bandwidth is required.

SUMMARY OF THE INVENTION

The present invention provides a rendering apparatus performing a depth test by reading a depth value from a depth buffer and using the read depth value, while consuming a minimum memory bandwidth.

The present invention also provides a rendering method so as to perform a depth test by reading a depth value from a depth buffer and using the read depth value, while consuming a minimum memory bandwidth.

The present invention also provides a computer readable recording medium having embodied thereon a computer program for executing a method of performing a depth test by reading a depth value from a depth buffer and using the read depth value, while consuming a minimum memory bandwidth.

According to an aspect of the present invention, there is provided a rendering apparatus including: a depth buffer storing compressed blocks each of which comprises pixels having respective depth values; and a rendering unit reading a block, corresponding to a fragment, from the depth buffer in consideration of frequency information indicating the number of predetermined number and prepared in advance, restoring the read block, and performing a depth test for the fragment by considering the restored block.

According to another aspect of the present invention, there is provided a rendering method including: from a depth buffer storing compressed blocks each of which comprises pixels having respective depth values, reading a block, corresponding to a fragment, from the depth buffer in consideration of frequency information indicating the number of predetermined number and prepared in advance; and restoring the read block and performing a depth test for the fragment by considering the restored block.

According to another aspect of the present invention, there is provided a computer readable recording medium having embodied thereon a computer program for executing a rendering method wherein the method includes: from a depth buffer storing compressed blocks each of which comprises pixels having respective depth values, reading a block, corresponding to a fragment, from the depth buffer in consideration of frequency information indicating the number of predetermined number and prepared in advance; and restoring the read block and performing a depth test for the fragment by considering the restored block.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The attached drawings for illustrating embodiments of the present invention are referred to in order to gain a sufficient understanding of the present invention, the merits thereof, and the objectives accomplished by the implementation of the present invention.

Hereinafter, a rendering apparatus and method according to an embodiment of the present invention will be described in detail by explaining embodiments of the invention with reference to the attached drawings.

Figure 1:
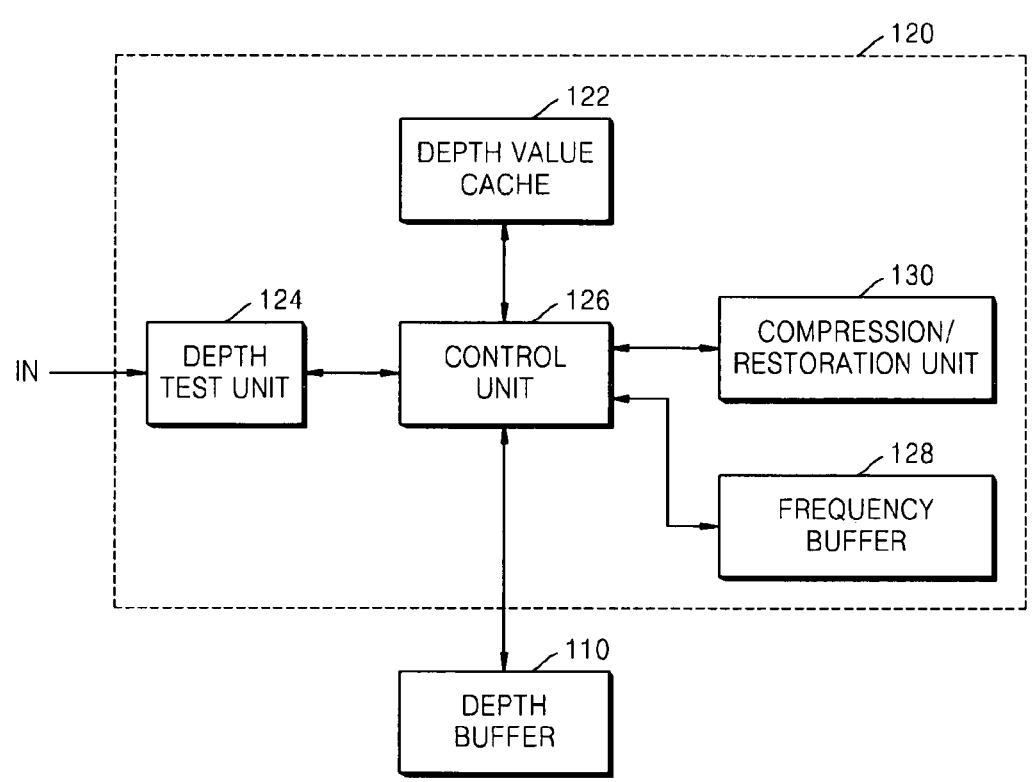
FIG. 1 is a block diagram illustrating a rendering apparatus according to an embodiment of the present invention.

FIG. 1 is a block diagram illustrating a rendering apparatus according to an embodiment of the present invention, the rendering apparatus including a depth buffer 100 and a rendering unit 120.

The depth buffer 110 stores a depth value of a pixel that can be expressed on a screen. In the present specification, the screen means a screen on which a result rendered by the rendering apparatus according to the current embodiment is to be displayed.

More specifically, the depth buffer 110 stores blocks. In the present specification, a block is a basic unit of pixels to be read from or to be written to the depth buffer 100. Accordingly, the block is a set of pixels each of which having depth value. Hereinafter, for convenience of explanation, it is assumed that one block is 8*8 pixels in which 8 pixels exist in each row and 8 pixels exist in each column.

However, the depth buffer 110 stores compressed blocks. Considering that the contents of each block are different, the degrees of compression of the blocks stored in the depth buffer 100 are generally different from each other.

Meanwhile, the rendering apparatus according to the current embodiment generates a plurality of fragments for each of the planes formed by vertexes forming a model that is to be rendered. In this case, each vertex has the location and color information of the vertex, and each fragment has information regarding the location on a screen at which the fragment is displayed, and information regarding the depth value, the stencil value, and the color value of the fragment. The fragment is named as a pixel only after the information items of the fragment are written to a frame buffer (not shown). That is, a screen of a display apparatus (not shown) such as a liquid crystal display (LCD) displays a fragment of which information is written to a frame buffer (not shown), as a pixel, according to the written information.

The frame buffer stores the pixel value of each pixel that can be expressed on the screen. In this case, the pixel value includes at least one of a stencil value, a depth value, and a color value. For this, the frame buffer may include a depth buffer, a stencil buffer (not shown), and a color buffer (not shown). In this case, the stencil buffer stores the stencil value of each pixel that can be expressed on the screen, and the color buffer stores the color value of each pixel that can be expressed on the screen. In order for the color value of a fragment to be stored in the color buffer, an alpha test of the fragment should be passed. Likewise, in order for the stencil value of the fragment to be stored in the stencil buffer, a stencil test of the fragment should be passed. Similarly to this, in order for the depth value of the fragment to be stored in the depth buffer 110, a depth test of the fragment should be passed.

The alpha test of the fragment means comparing a first reference value specified by a user in relation to the fragment with an alpha value stored in the color buffer. In this case, the alpha value is one of color information items, and includes information regarding transparency. The result of the alpha test may be 'pass' or 'fail', and respective specific expressions of 'passed the alpha test' and 'failed the alpha test' may be set accordingly by the user. For example, passing the alpha test may mean that the first reference value is greater than the stored alpha value, and failing the alpha test may mean that the first reference value is equal to or less than the stored alpha value.

The stencil test of the fragment means comparing a second reference value specified by the user in relation to the fragment with a stencil value stored in the stencil buffer. The result of the stencil test may be 'pass' or 'fail', and respective specific expressions of 'passed the stencil test' and 'failed the stencil test' may be set accordingly by the user. For example, passing the stencil test may mean that the second reference value is greater than the stored stencil value, and failing the stencil test may mean that the second reference value is equal to or less than the stored stencil value.

The depth test of the fragment test means comparing the depth value of the fragment with the depth value of 'a pixel corresponding to the fragment' and stored in the depth buffer. Also, the result of the depth test of the fragment may be 'pass' or 'fail' and respective specific expressions of 'passed the depth test' and 'failed the depth test' may be set accordingly by the user. For example, passing the depth test may mean the depth value of the fragment is greater than the stored depth value and failing the depth test may mean the depth value of the fragment is equal to or less than the stored depth value.

A more detailed explanation of the depth test according to an embodiment of the present invention will be replaced by explaining the rendering unit 120 hereinafter. Here, the rendering unit 120 may include a depth value cache 122, a depth test unit 124, a control unit 126, a frequency buffer 128, and a compression/restoration unit 130.

The depth value cache 122 stores a part of the depth values stored in the depth buffer 110. More specifically, the depth value cache 122 stores at least one block from among the blocks stored in the depth buffer 110. However, while the depth buffer 110 stores compressed blocks, the depth value cache 122 stores blocks that are not compressed.

The depth test unit 124 receives a fragment as an input through an input terminal IN. In this case, the control unit 126 tests whether or not a depth value of a pixel corresponding to the input fragment exists in the depth value cache 122.

If it is determined that the depth value of the pixel corresponding to the fragment exists in the depth value cache 122, the control unit 126 reads the depth value of the pixel corresponding to the fragment, from the depth value cache 122, and outputs the read depth value to the depth test unit 124. The depth test unit 124 compares the input depth value with the depth value of the fragment, thereby performing a depth test of the fragment. If the test result indicates that the fragment passed the depth test, the control unit 126 updates the depth value of the pixel stored in the depth value cache 122 corresponding to the fragment, with the depth value of the fragment.

Otherwise, if the test result indicates that the depth value of the pixel corresponding to the fragment does not exist in the depth value cache 122, the control unit 126 reads the depth value of the pixel corresponding to the fragment, from the depth buffer 110, by reading frequency information corresponding to the fragment from frequency information items stored in the frequency buffer 128 and then considering the read frequency information. For this, the control unit 126 reads a block, corresponding to the fragment, from the depth buffer 110, by considering the read frequency information. More specifically, by considering the read frequency information, the control unit 126 calculates the data size in which the block corresponding to the fragment is compressed in the depth buffer 110. Since the control unit 126 recognizes which block from among the blocks stored in the depth buffer 110 corresponds to the fragment, the control unit 126 can read the block, corresponding to the fragment, from the depth buffer 110, based on the calculated data size. In the present specification, the frequency information is prepared in each of the blocks stored in the depth buffer 110, and indicates the number of predetermined numbers among depth values of the block.

In this case, a predetermined number may indicate the number of preset second incrementals, from among the second incrementals of the depth values of the block. Here, the second incremental of the depth value of a pixel corresponding to a block means the first incremental between the first incremental of the depth value of the pixel and the first incremental of the depth value of a pixel adjacent to the pixel.

Likewise, the first incremental of the depth value of a pixel corresponding to a block means the incremental between the original value of the depth value of the pixel and the original value of the depth value of a pixel adjacent to the pixel.

Thus, if the control unit 126 reads the block, corresponding to the fragment, from the depth buffer 110, the compression/restoration unit 130 restores the read block, and the control unit 126 stores the restored block in the depth value cache 122. Then, the control unit 126 reads the depth value of the pixel corresponding to the fragment, from the depth value cache 122, and outputs the read depth value to the depth test unit 124. The depth test unit 124 compares the input depth value from the control unit 126 with the depth value of the fragment, thereby performing the depth test of the fragment. If the test result indicates that the fragment passes the depth test, the control unit 126 updates the depth value of the pixel corresponding to the fragment stored in the depth value cache 122 with the depth value of the fragment.

Meanwhile, the compression/restoration unit 130 may compress the block updated by the control unit 126, from among at least one block stored in the depth value cache 122. In this case, the control unit 126 may update 'the block corresponding to the updated block, from among blocks stored in the depth value cache 122', among the blocks stored in the depth buffer 110, with 'the block compressed by the compression/restoration unit 130'.

As described above, according to the current embodiment of the present invention, compressed blocks are stored in the depth buffer 110, and therefore the rendering unit 120 can fetch a block from the depth buffer 110 by using a minimum memory bandwidth. Also, according to the current embodiment, the rendering unit 120 accurately calculates the data size of a block to be fetched from the depth buffer 100, by considering the frequency information stored in the frequency buffer 128 disposed in the rendering unit 120, and reads a block from the depth buffer 110, by considering the calculated data size. Accordingly, the rendering unit 110 can accurately read only a block required for the depth test of a fragment, from the depth buffer 110.

Examples of operations of the depth buffer 110, the depth value cache 122, the depth test unit 124, the control unit 126, the frequency buffer 128, and the compression/restoration unit 130 are described above. A variety of modifications of the examples are also possible. For example, the operations of the control unit 126 described above, may be performed by separate and different modules unlike the case in which the operations are performed by one unit as illustrated in FIG. 1.

Likewise, part of the operations of the control unit 126 described above may be implemented by one of the depth value cache 122, the depth test unit 124, and the compression/restoration unit 130. Meanwhile, the depth buffer 110 may be disposed outside the rendering unit 120 as illustrated in FIG. 1, and unlike in the FIG. 1, the depth buffer 110 may be disposed only outside the rendering unit 120, or the depth buffer 110 may be implemented as a plurality of depth buffers separately disposed inside and outside the rendering unit 120. If the depth buffer 120 is implemented as a plurality of depth buffers separately disposed inside and outside the rendering unit 120 as such, blocks which are expected to be read frequently may be stored in a depth buffer disposed inside the rendering unit 120, and blocks which are not expected to be read frequently may be stored in a depth buffer disposed outside the rendering unit 120.

Figure 2A:
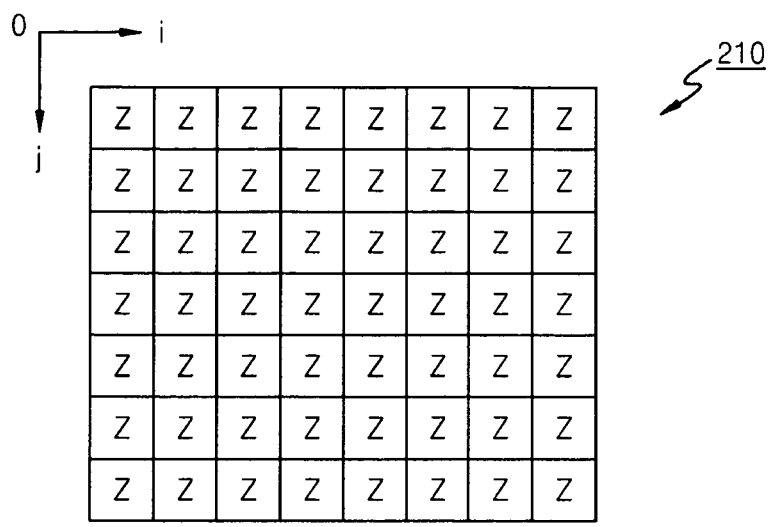
FIGS. 2A and 2B are reference diagrams for explaining a depth buffer, illustrated in FIG. 1, according to an embodiment of the present invention.
Figure 2B:
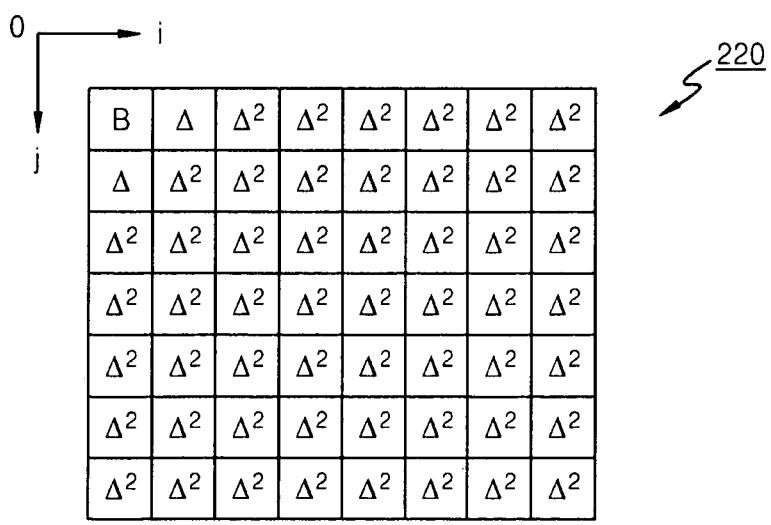

FIGS. 2A and 2B are reference diagrams for explaining the depth buffer 110, illustrated in FIG. 1, according to an embodiment of the present invention. More specifically, FIG. 2A illustrates a block 210 which is not compressed, while FIG. 2B illustrates a block 220 generated by performing differential differential pulse code modulation (DDPCM) with the block 210 illustrated in FIG. 2A.

In each of the block 210 and the block 220, 8 pixels exist in each row and 8 pixels exist in each column as assumed above. That is, the position of each of the pixels forming either of the blocks 210 or 220 is one of (i, j)=(1, 1), (1, 2), (1, 3), (1, 4), (1, 5), (1, 6), (1, 7), (1, 8), (2, 1), (2, 2), (2, 3), (2, 4), (2, 5), (2, 6), (2, 7), (2, 8), (3, 1), . . . , (8, 1), (8, 2), (8, 3), (8, 4), (8, 5), (8, 6), (8, 7), (8, 8).

Referring to FIG. 2A, Z denotes a depth value, and referring to FIG. 2B, B denotes an original value, $\Delta$ denotes a first incremental, and $\Delta^2$ denotes a second incremental.

That is, B of the pixel positioned at (i,j)=(1,1) means the depth value Z of the pixel positioned at (i,j)=(1,1), and $\Delta$ of the pixel positioned at (i,j)=(1,2) means the incremental between the depth value Z of the pixel positioned at (i,j)=(1,1) and the depth value Z of the pixel positioned at (i,j)=(1,2), and $\Delta$ of the pixel positioned at (i,j)=(2,1) means the incremental between the depth value Z of the pixel positioned at (i,j)=(1,1) and the depth value Z of the pixel positioned at (i,j)=(2,1). Likewise, $\Delta^2$ of the pixel positioned at (i,j)=(1,3) means the incremental between $\Delta$ of the pixel positioned at (i,j)=(1,2) and $\Delta$ of the pixel positioned at (i,j)=(1,3), and $\Delta^2$ of the pixel positioned at (i,j)=(3,1) means the incremental between $\Delta$ of the pixel positioned at (i,j)=(2,1) and $\Delta$ of the pixel positioned at (i,j)=(3,1). All of the $\Delta^2$s illustrated in FIG. 2B are values calculated based on this principle.

Thus, the block 220 illustrated in FIG. 2B is formed by one original value, two first incrementals, and 61 second incrementals. In this case, the more that repeated numbers appear among the second incrementals expressed on the block 220, the more the block 210 can be compressed. For example, if a majority of second incrementals expressed on the block 220 are one of '−1, 0, 1' and a minority of the second incrementals are values other than '−1, 0, 1', the smaller number of the values other than '−1, 0, 1' among the second incrementals means better compression of the block 210. In this case, each of −1, 0, and 1 is a number in decimal notation.

A block stored in the depth buffer 110 is a compressed block. Since the second incrementals of the block 220, for which DDPCM is performed, are expressed by a less number of bits than that for the first incrementals, the block 220 generated by compressing the block 210 is an example of blocks stored in the depth buffer 110.

For example, the depth value of each pixel of the block 210 illustrated in FIG. 2A is expressed by 16 bits; B and $\Delta$ of the block 220 illustrated in FIG. 2B are expressed by 16 bits each; $\Delta^2$ is expressed by 2 bits; and each of the values other than '−1,0,1' among $\Delta^2$ values are expressed by 16 bits. In this case, the block 210 illustrated in FIG. 2A is expressed by 1024 bits (∵16*64), but after compression it is expressed by '170+16*X' bits (∵1*16+61*2+X*16), and stored in the depth buffer 110. In this case, X denotes the number of the numbers other than '−1,0,1' among $\Delta^2$ values of the block 220.

Meanwhile, when the block generated by compressing the block 210 illustrated in FIG. 2A is stored in the depth buffer 110, the frequency buffer 128 stores frequency information corresponding to the compressed block. In this case, the frequency information may be information indicating the number of predetermined numbers among depth values of the block 210. More specifically, the frequency information may be information indicating the number of preset second incrementals (for example, the numbers other than −1, 0, 1) among second incrementals of the block 220.

Figure 3:
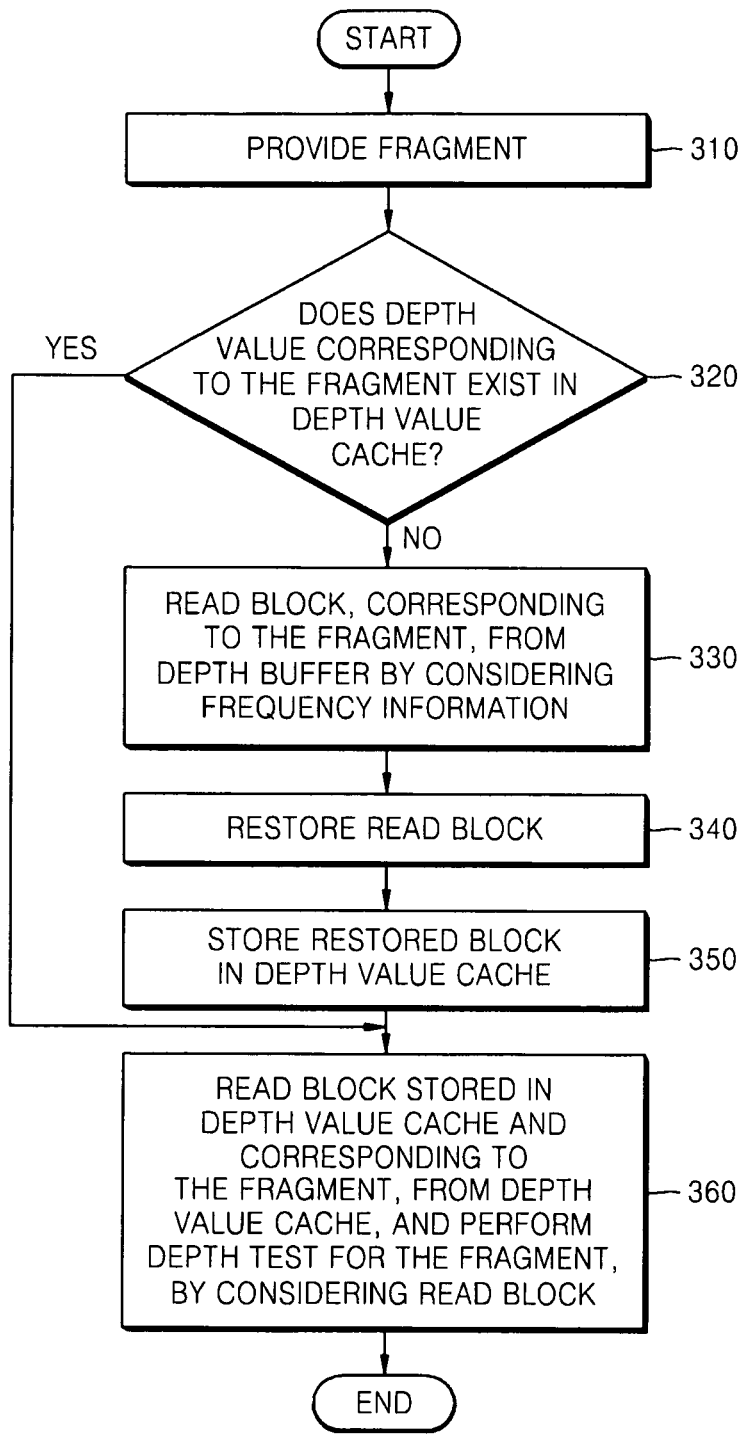
FIG. 3 is a flowchart illustrating operations of a rendering method according to an embodiment of the present invention.

FIG. 3 is a flowchart illustrating operations of a rendering method, according to an embodiment of the present invention. The method may include operations 310 through 360 for reading a depth value from a depth buffer, and performing a depth test by using the read depth value, while consuming a minimum memory bandwidth.

If a fragment is input to the rendering unit 120 in operation 310, the rendering unit 120 tests whether or not a depth value corresponding to the fragment input in operation 310 exists in the depth value cache 122 disposed in the rendering unit 120 in operation 320.

If it is determined in operation 320 that the depth value exists, the rendering unit 120 reads a block, corresponding to the fragment, from the depth buffer 110, by considering frequency information, corresponding to the fragment input in operation 310, among frequency information items stored in the frequency buffer 128 disposed in the rendering unit 120 in operation 330.

The rendering unit 120 restores the block read in operation 330, in operation 340, and stores the block in the depth value cache 122 in operation 350.

The rendering unit 120 reads a block, corresponding to the fragment input in operation 310 and stored in the depth value cache 122, from the depth value cache 122, and performs a depth test for the fragment by considering the read block in operation 360.

Otherwise, if it is determined in operation 320 that the depth value does not exist, operation 360 is performed.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, such as digital versatile discs (DVDs), and carrier waves (such as data transmission through the Internet).

While the present invention has been particularly shown and described with reference to exemplary embodiments thereof, it will be understood by one of ordinary skill in the art that various changes in form and details may be made therein without departing from the spirit and scope of the present invention as defined by the following claims. The embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A rendering apparatus comprising:
a depth buffer storing compressed blocks each of which comprises pixels having respective depth values; and
a rendering unit reading a block, corresponding to a fragment, from the depth buffer in consideration of frequency information corresponding to the fragment and indicating the number of preset second incremental values for the depth values of the pixels, restoring the read block, and performing a depth test for the fragment by considering the restored block,
wherein the rendering unit comprises a frequency buffer to store frequency information of the stored compressed blocks,
wherein the rendering unit reads the frequency information corresponding to the fragment, from the frequency buffer, calculates a data size of the block based on the read frequency information, and reads the block from the depth buffer, based on the calculated data size.

2. The apparatus of claim 1, wherein the frequency information is prepared for each of the blocks in the rendering unit.

3. The apparatus of claim 1, wherein the degrees of compression of the blocks stored in the depth buffer are different from each other.

4. A rendering method comprising:
storing compressed blocks in a depth buffer, each of the compressed blocks comprising pixels having respective depth values;
storing, in a frequency buffer, frequency information of the stored compressed blocks indicating the number of preset second incremental values for the depth values of the pixels,
reading a block, corresponding to a fragment, from the depth buffer in consideration of the frequency information corresponding to the fragment; and
restoring the read block and performing a depth test for the fragment by considering the restored block,
wherein, in the reading of the block from the depth buffer, the frequency information corresponding to the fragment is read from the frequency buffer, a data size of the block is calculated based on the read frequency information, and the block is read from the depth buffer, based on the calculated data size.

5. The method of claim 4, wherein the frequency information is prepared for each of the blocks outside the depth buffer.

6. The method of claim 4, wherein the degrees of compression of the blocks stored in the depth buffer are different from each other.

7. A non-transitory computer readable recording medium having embodied thereon a computer program for executing any one of the methods of claim 4, 5, and 6.

8. The apparatus of claim 1, wherein the depth test comprises comparing the depth value of the fragment with the depth value of a pixel corresponding to the fragment of the restored read block.

9. A rendering apparatus comprising:
a depth value cache to store blocks of pixels having respective depth values;
a depth buffer to store compressed blocks of pixels having respective depth values;
a frequency buffer to store frequency information of the stored compressed blocks indicating the number of preset second incremental values for the depth values of the pixels;
a control unit to read frequency information corresponding to a fragment, recognize which block in the depth buffer corresponds to the fragment, and then read the block by using the stored frequency information in the frequency buffer;
a restoration unit to restore the read block to the depth value cache; and
a depth test unit to compare the depth value of the fragment with the depth value of the restored block.

* * * * *